United States Patent [19] [11] 4,154,690
Ballies [45] May 15, 1979

[54] DEVICE FOR USE IN THE CENTRIFUGAL SEPARATION OF COMPONENTS OF A LIQUID

[76] Inventor: Uwe Ballies, Jägersberg 7-9, Kiel, Fed. Rep. of Germany

[21] Appl. No.: 887,034

[22] Filed: Mar. 15, 1978

[30] Foreign Application Priority Data

| | | | |
|---|---|---|---|
| Mar. 16, 1977 | [DE] | Fed. Rep. of Germany | 2711336 |
| Aug. 2, 1977 | [DE] | Fed. Rep. of Germany | 2734720 |
| Aug. 2, 1977 | [DE] | Fed. Rep. of Germany | 2734764 |
| Aug. 2, 1977 | [DE] | Fed. Rep. of Germany | 2734781 |

[51] Int. Cl.[2] ............ B01D 17/00

[52] U.S. Cl. ............ 210/516; 210/DIG. 23; 233/1 R; 233/26

[58] Field of Search ............ 210/DIG. 23, DIG. 24, 210/513, 514, 515, 516, 518; 128/2 F, 214 R, DIG. 5; 233/1 A, 1 R, 26; 23/230 B, 258.5, 259, 292

[56] References Cited

U.S. PATENT DOCUMENTS

| | | | |
|---|---|---|---|
| 3,366,103 | 1/1968 | Keller | 128/DIG. 5 |
| 3,433,216 | 3/1969 | Mattson | 128/DIG. 5 |
| 3,493,503 | 2/1970 | Mass | 210/DIG. 23 |
| 3,508,653 | 4/1970 | Coleman | 210/DIG. 23 |
| 3,865,731 | 2/1975 | Seitz | 210/DIG. 23 |

*Primary Examiner*—Frank Sever
*Attorney, Agent, or Firm*—Cushman, Darby & Cushman

[57] ABSTRACT

A device for use in blood centrifugation processes, said device comprising a centrifuge tube containing a substantially rigid separator element and said tube having walls of predetermined thickness and material of construction to enable flexing of only that portion of the tube wall coincident with said separator element, sufficient to enable passage of liquid by said separator element, in response to centrifugal force.

22 Claims, 14 Drawing Figures

DEVICE FOR USE IN THE CENTRIFUGAL SEPARATION OF COMPONENTS OF A LIQUID

This invention relates to a device for use in the centrifugal separation of components of a liquid.

So that the components of a liquid, e.g. blood, of different specific gravities may be separated by centrifuging, and that subsequent remixing of the components may be prevented, use has been made until now of glass vessels containing a plug consisting of an elastomeric material and displaceable by centrifugal force, the diameter of the plug being greater than that of the glass vessel. Separator elements of this nature, such as disclosed in U.S. Pat. No. 3,508,653, have the disadvantage that they must be produced to very close tolerances to secure an effective seal, with these instruments, the frictional forces can be so great that no separation or only poor separation may occur. Centrifuging containers are also known from DE-OS No. 2,535,580, where a separator element is located in the separator tube, the specific gravity of the element being between those of the components which are to be separated, and the external diameter being considerably smaller than the internal diameter of the tube; in this case, sealing is intended to be established by an elastic disc or washer bearing against the side of the vessel and operating as a filter. With such separator tubes, considerable remixing of substances dissolved in the one phase, such as potassium ions or enzymes such as LDH, may be caused by diffusion through the filter, so that the vessels are unsuitable for protracted storage or for transporting after centrifuging. An analogous device is known, moreover, from DE-OS No. 2,243,569, for maintaining the separation of heavier and lighter phases of a liquid, wherein a cylindrical coil having a central axial opening carries an annular flange at one extremity to establish a sliding sealing contact with the inner surface of the glass tube; after separation of the liquid components, the central opening of the coil is at least temporarily closed by a plug. In this case too, the plug may be loosened from its sealing seat, e.g., during transport, so that remixing of the components again occurs. Furthermore, with all these devices, the liquid, e.g., blood, must be introduced into the device in a relatively laborious manner, either after perforation of a rubber cap or by means of a pipette, possibly through the axial bore of the coil-shaped separator element.

It is an object of the invention to eliminate or at least reduce these disadvantages by providing a device which is uncomplicated and may easily be produced, e.g., by an injection moulding process, and with which remixing of the components of a liquid or of a diffusion of dissolved ingredients is prevented after centrifuging, even during transport of the separator device or during protracted storage. A further object is to simplify the charging of the separator device.

In accordance with the present invention, there is provided a device for the centrifugal separation of a liquid having at least two components, the device comprising a separator tube and a separator element having a specific gravity between those of the components to be separated, in which the separator tube is formed of plastics material and the separator element comprises a cylindrical member which has an external diameter effectively equal to the internal diameter of the tube and which is movable into the tube under sliding friction with the inner face of the tube.

It may be found surprising that the individual components can be separated with the inventive separator device in accordance with the same principle as that of known devices, as the external diameter of the separator element is equal to the internal diameter of the tube. However, this is due to the fact that the tube produced from plastics material expands slightly under pressure from the liquid in the tube being centrifuged, and thus the internal diameter of the tube increases slightly. The annular gap formed between the tube wall and the separator element only during centrifuging, allows a separation of what may be referred to as the heavier and lighter components. Once centrifuging is completed, the tube regains its original diameter, and effectively holds the separator element fast in its position between the two components; this acts against subsequent remixing of liquid components, since there are two chambers effectively separated from one another.

In a preferred embodiment, the separator element is releasably connected to a piston or rod arranged to slide within the tube, so that, after completion of a suction intake operation and closure of the tube, the device may be inserted directly into a centrifuge without intermediate transfer of the liquid.

The separator element is preferably constructed as a cylindrical member which may have end faces curved inwards and/or outwards. The separator element may also be formed with lateral guiding fins or webs to prevent jamming during the centrifuging operation.

Furthermore, the separator element may be releasably connected to a sealing plug for the separator tube. After being filled, the tube is closed by this plug, and the centrifuging operation is commenced. The separator element remains connected at the beginning of the centrifuging action and becomes disconnected when a particular centrifugal force is exceeded. It is only then that the separator element travels away from the axis of the centrifuge and towards the bottom part of the tube and the separating operation, which may even be completed, is not disturbed as the full centrifugal force continues during this displacement. The releasable connection between the separator element and the plug or a piston may, for example, comprise complementary adhesive surfaces of plane or curved form on both parts, or may comprise interlocking parts, e.g., in the form of a recess and a projecting peg which may have an enlarged head to engage in an appropriate enlargement in the recess.

The separator device according to the invention may have means for connection to a hypodermic needle and have the separator element connected to a suction piston. In a preferred simple construction, the device may be used to take blood and then be inserted into a centrifuge with only a few operations. This is accomplished by means of a separator element connected through a predetermined fracture section to a piston rod which extends into the separator tube. In this case the separator element acts as a suction piston for the drawing-off of blood, and the piston rod is then separated from the separator element by breaking at the fracture section, after closure of the suction opening of the needle connectors. The separator tube is then closed by means of a conventional plug, whereupon the device is ready for insertion into the centrifuge.

Suitably, the fracture section is formed at the side remote from the suction opening of the hypodermic needle connector, the separator element being of conical form and merging into the piston rod in this area.

For closing off the hypodermic needle connector, a cover of preferably approximately hemispherical shape is provided, the rim of the cover being in snap-in engagement with a lower rim portion of the separator tube. The connector bore may moreover be closed by means of a cap which is preferably joined to the hemispherical cover through a trunk portion. It is advantageous, moreover, for the covering cap to have a finger sealingly engaging in the bore of the connector.

After the tube has been charged with blood and the piston rod has been removed, the separator tube is closed at the top by a conventional sealing plug and is then sealed off in the area of the hypodermic needle connector. The device is then ready for insertion into the centrifuge. It is thus not necessary to remove the connector from the separator tube and apply another closure appropriate for the centrifuge, or to centrifuge the tube in the reversed position, i.e., with suction plunger, which may still remain, facing downwards.

Since separator devices are frequently intended to be inserted into a centrifuge just after blood has been withdrawn and charged into the tube, it is sometimes necessary to add solutions such as anti-coagulant or stabilising solutions, during or shortly after charging. To render this possible, it may be advantageous to incorporate a closed chamber wherein the required solid or fluid additives may already be present. The additives are then mixed directly with the blood, during intake by suction, so that the separator device may be placed directly in the centrifuge, possibly after removal of the suction piston or piston rod and possibly after sealing off the hypodermic needle connector.

In a preferred embodiment, the separator tube is provided with a needle connector having a bore which extends inwardly through a tubular extension leading into the inside of the separator tube. The bore of the tubular extension may be arranged to be closed by a finger-like projection from the base of the separator element. It is desirable for the bores of the connector and the tubular extension to be coaxial.

In another embodiment in accordance with the invention, the wall thickness of the separator tube is increased towards the bottom of the tube which maintains a constant internal diameter. This construction acts to delay the release or travel of the separator element until the phase separation has already started. In an alternative embodiment, the internal diameter of the separator tube is slightly increased in its lower portion, to accomplish a similar purpose. In both cases, the separator element travels more slowly to the phase boundary under the action of centrifugal force, because the increase of the internal diameter of the tube by expansion is smaller due to the increased wall thickness, and/or because the internal diameter of the separator tube is reduced towards the lower area. The increase of the wall thickness, or the reduction of the internal diameter, preferably lies within a range from 0.01 to 0.4 mm.

In the case of incompletely charged separator tubes, the expansion of the tube diameter is smaller during contrifuging because of inadequate internal pressure, so that the forming of an annular gap may not occur and the separator element may merely compress the air present above the fluid. To prevent this occurring, spirally extending grooves may be formed in the upper portion of the internal surface of the tube. Also, the internal surface of the tube, and particularly the grooves, may be coated with a paste such as a silicone oil or a silicone grease, in order to delay the movement of the separator element. This is of importance in cases of blood treated to prevent coagulation, since thrombocytes for example, follow the separation of the red blood corpuscles from the upper already separated phase, with a slight delay.

Embodiments of the invention will now be described, by way of example, with reference to the accompanying drawings in which:

FIGS. 1*a* to 1*c* are diagrams illustrating the mode of operation of a separator device according to the invention;

Figure 1A:
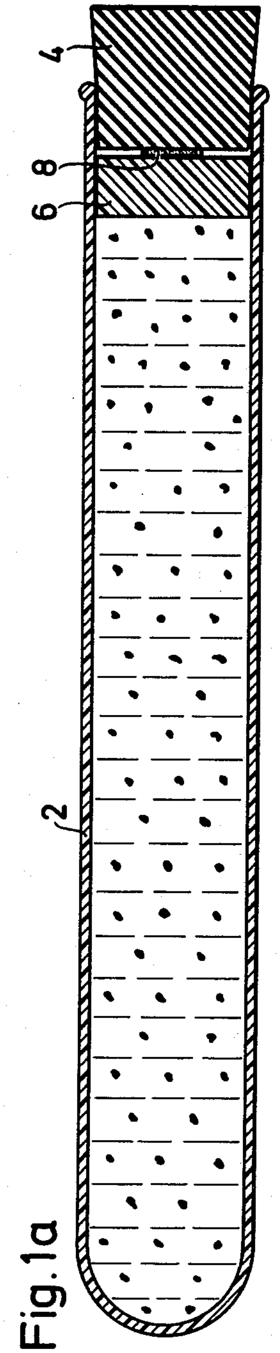
Figure 1B:
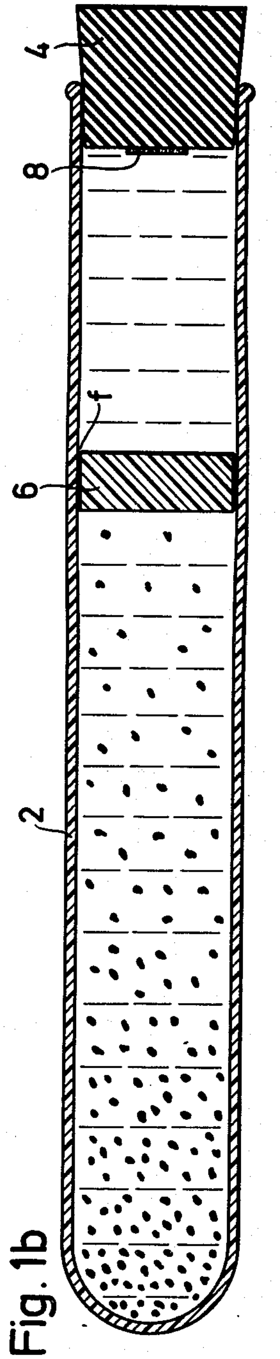
Figure 1C:
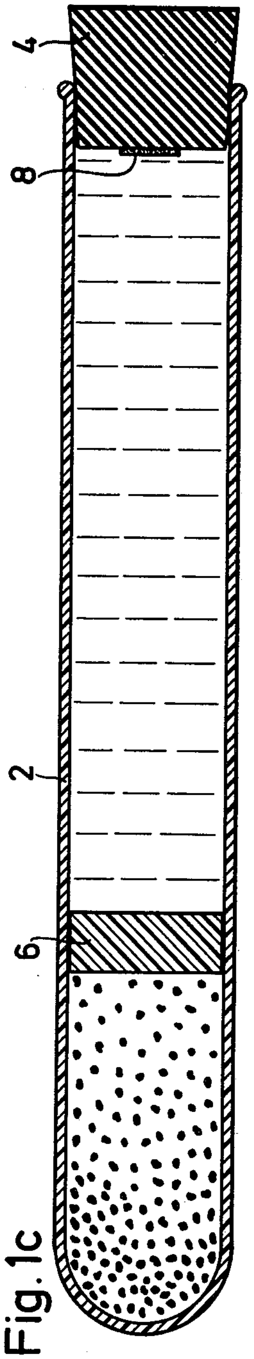

Referring to the drawings, FIGS. 1*a* to 1*c* show the mode of operation of the separator device according to the invention. The illustrations show the separator tube horizontal, which is the position often assured in centrifuges. Initially, separator tube 2 is closed by sealing plug 4, a separator element 6 in the form of a cylindrical member being connected to the underside of the plug 4 by means of a coupling element 8. Referring to FIG. 1*a*, the two phases of liquid which are to be separated are denoted by lines or dots, the lines denoting the liquid phase and the dots denoting a heavier, and, for example, solid phase dispersed in the liquid phase. FIG. 1*b* shows the condition established after a particular period of operation of the centrifuge, the element 6 being detached from the coupling element 8, and a partial separation already having occurred. The separation between the two phases occurs through an annular gap (f) between the separator element 6 and the side of the tube, formed by expansion of the tube due to the pressure exerted by the liquid being centrifuged. Upon continuing the centrifuging action, the liquid phase travels past the separator element 6, which slides towards the bottom of the tube and floats on the heavier phase.

The separator element 6 may be formed of suitable materials, in particular a plastics material, and the element may be solid, hollow, or weighted. In the separation of blood, use is preferably made of a separator element of polystyrene, having a specific weight of 1.05, that is lighter than the erythrocyte layer which has specific weight of 1.09 and a little heavier than the plasma or serum layer which has a specific weight of 1.04 to 1.045.

Figure 2:
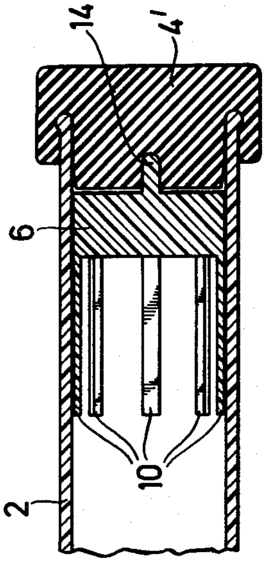
FIG. 2 is a fragmentary cross-section through the upper part of a separator tube wherein a separator element is releasably connected to a sealing plug.

In the construction shown in FIG. 2, sealing plug 4' extends beyond and around the rim of the separator tube 2. The separator element 6 has a peg 14 engaging, as a coupling element, in a corresponding recess in the plug. The element 6 is, moreover, protected against jamming within the separator tube by means of integral fingers 10.

Figure 3:
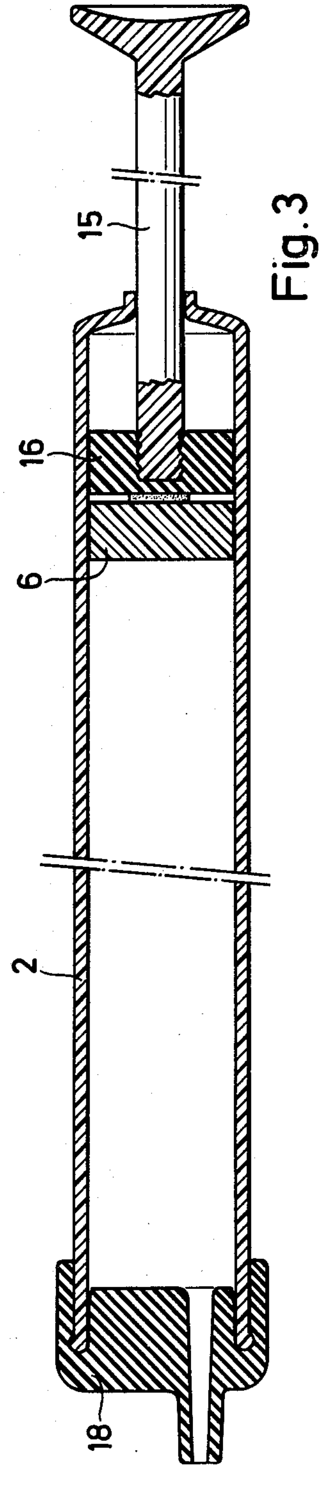
FIG. 3 is a cross-section, partly broken away, through a separator tube wherein the separator element is releasably connected to a piston in the tube.

In the arrangement shown in FIG. 3, the separator tube is provided at one end with a piston 16 and, at the other end, with an end member 18 arranged to receive a hypodermic needle. The hollow stem on the member 18 which provides a spigot connector for the needle, may be positioned coaxially with respect to the tube, but is preferred to be eccentric thereto. The separator element 6 is connected to the piston 16 by a coupling element. With a separator device of this kind, it is possible to draw blood after attaching the hypodermic needle, remove the end member 18, replace this member by a sealing element, and then insert the separator tube directly into the centrifuge after removal of the piston rod 15.

Figure 4:
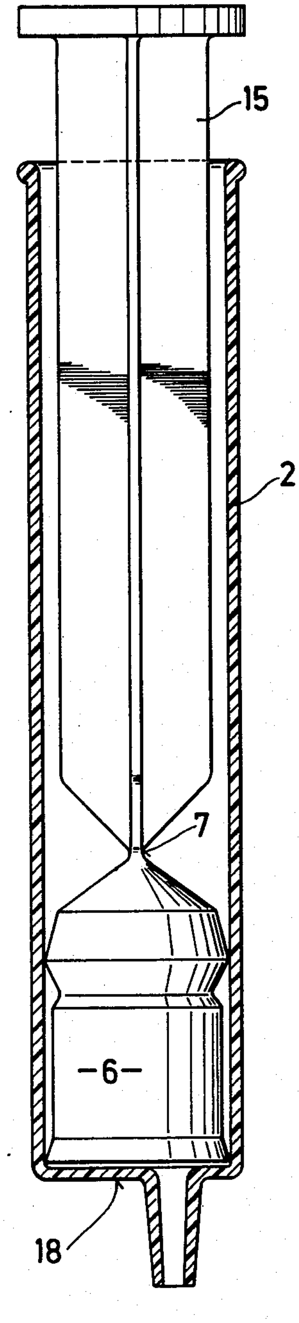
FIG. 4 is a cross-section through a operation; form of separator device prior to a blood withdrawing opertion.

In the construction shown in FIG. 4, the separator element or member 6 is situated, within the separator tube 2, close to the bottom of the tube or rather to the region of the end member 18 which again provides a tubular spigot connector for a hypodermic needle. The separator element 6 is conical at its side facing away from the end member 18 and extends to piston rod 15 through a thinner or weaker section 7 which is designed as a fracture section.

Figure 5:
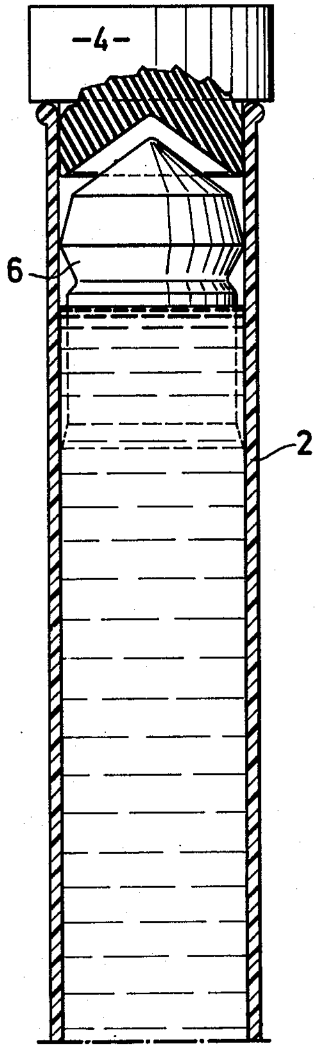
FIG. 5 is a fragmentary section corresponding to FIG. 4, but after the withdrawal of the blood.

In use of the construction shown in FIG. 5, the separator tube is sealed off after drawing blood, in a conventional manner not described at this stage. Separator element 6 is situated in the upper part of the separator tube 2 which is closed by a conventional sealing plug 4. The separator tube in placed in the centrifuge in this position and, after completion of the centrifuging operation and the formation of two layers of different specific gravities, the separator element in its new position prevents remixing in the boundary areas of these layers.

Figure 6:
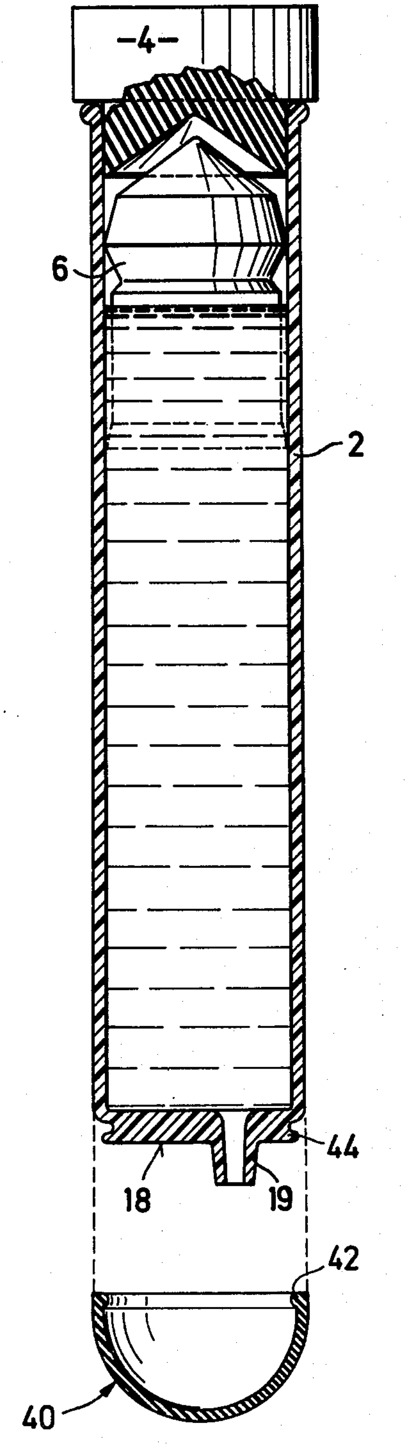
FIG. 6 is a cross-section through a further modified form of separator device comprising a tube having a cover at its lower end.

In the construction shown in FIG. 6, the separator element 6 is located within the separator tube 2 above the blood drawn in. In this arrangement, the piston rod is already removed and the separator tube 2 closed by means of a conventional sealing plug 4. The lower end member 18 which is formed with a tapered tubular spigot connector 19, is then closed by a cover 40 which is approximately hemispherical, the rim of the hemispherical cover 40 being snapped into engagement with lower end member 18. The cover 40 has a projecting lip 42 in its rim which is in engagement with a corresponding recess formed behind annular lip 44 on the end member 18.

A screw cover may alternatively be applied to a modified centrally-positioned spigot 19.

In the use of a cover of the just described kind, the fluid of greater specific gravity may pass into the hemispherical cover during centrifuging and may be withdrawn therefrom after the centrifuging operation.

Figure 7:
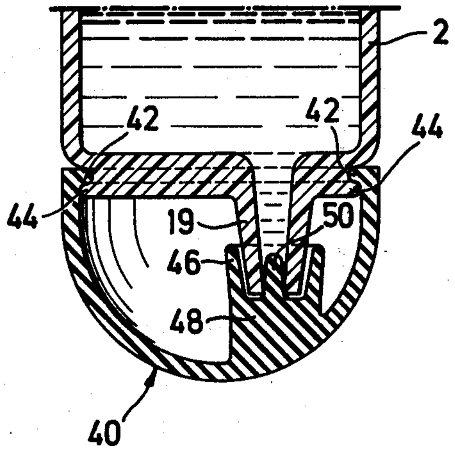
FIG. 7 is a detail view of the covered lower end of the separator tube according to FIG. 6.

In the modified construction shown in FIG. 7, the tapered spigot connector 19 is closed by a sealing cap 46. The cap 46 extends from the cover 40 through a trunk portion 48, and a sealing finger 50 extends into the bore of the connector 19.

The cover 40 is preferably formed from plastics material, for example a polyethylene of low flexibility.

Figure 8:
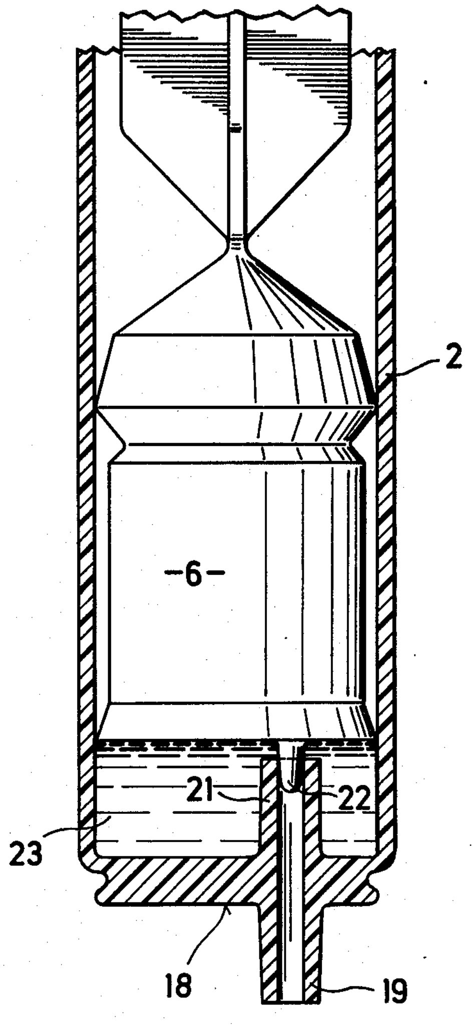
FIG. 8 is a fragmentary cross-section through yet a further modified form of separator device which includes a chamber for additives.

In the construction shown in FIG. 8, the separator element 6, which acts as a suction piston, is again located within the separator tube 2. The lower portion of the separator tube is again so constructed that a tapered spigot connector 19 extends from the end member 18 to receive a hypodermic needle.

The bore of the connector 19 continues in a tubular inward extension 21 from the end member 18. The tubular extension 21 extends into a storage chamber 23 which is defined by the inner surface of the separator tube 2 and, at the top and bottom, by the bottom face of the separator element 6 and the inner face of the member 18.

To prevent egress of the contents of the chamber 23, a finger-like projection 22 extends from the base of the element 6 to enter the upper end of the extension 21 and close the bore thereof.

The bores of the tapered connector 19 and the tubular extension 21 are preferably coaxial. The connector 19 may be arranged centrally, but alternatively eccentrically, with respect to the separator tube. The former arrangement facilitates the charging of the chamber with substances which are to be added to the blood, and the subsequent closure by engagement of the finger-like projection 22 in the bore of the tubular extension 21, while the latter facilitates the manipulation of the hypodermic device during the drawing of blood, particularly in the handling of the device whilst seeking a vein.

After being charged with additive, the separator tube may be sealed off both at the tapered spigot connector and at the upper extremity.

Figure 9:
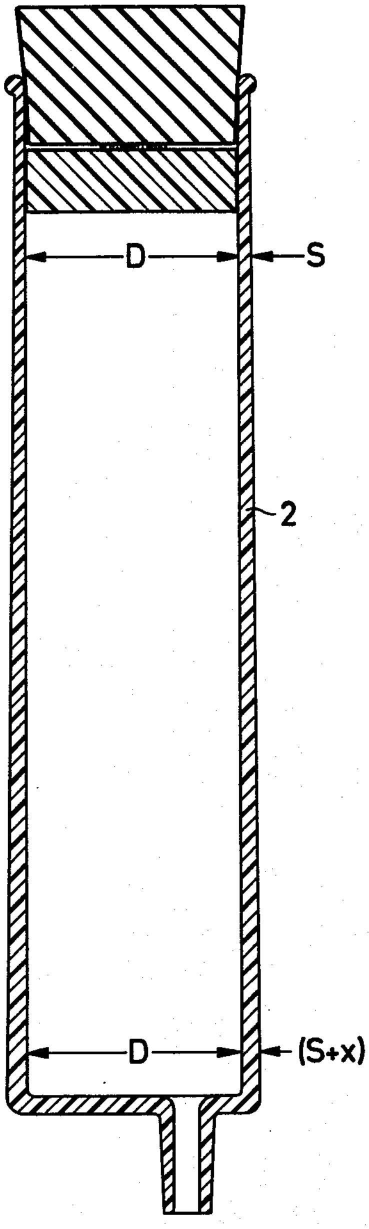
FIG. 9 is a cross-section through a separator tube having a wall thickness which increases in the downward direction.

In FIG. 9, the separator tube 2 has the same internal diameter (D) throughout, but the wall thickness increases (S) downwardly to (S+x). The result is that the expansion of the plastics material of the tube, under the action of the centrifugal force, is reduced in the lower portion, and so the separator element does move downwards, but slowly, after the establishment or the substantial establishment of the sedimentation balance. By increasing the speed of rotation during centrifuging, it is also possible to produce expansion of the tube even in the lower portion having the greater wall thickness, and thereby a continued upward transfer of the lighter component.

Figure 10:
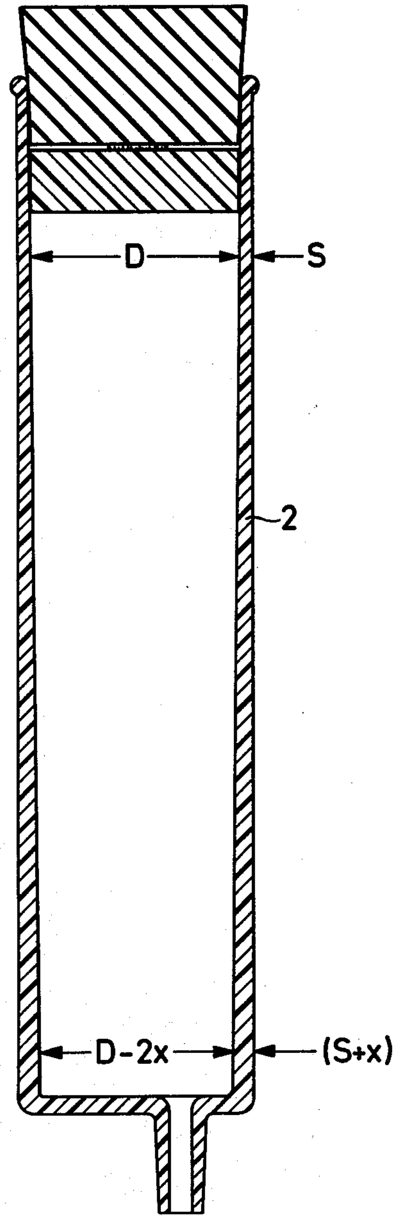
FIG. 10 is a cross-section through a separator tube having a downwardly decreasing internal diameter.

In FIG. 10, the internal diameter of the tube 2 is also reduced downwardly to (D−2x) to obtain similar results. Such variations in wall thickness or internal diameter vary within a range from 0.001 to 0.2 or 0.4 mm, depending on the nature of the material used for the separator tube and separator element.

Figure 11:
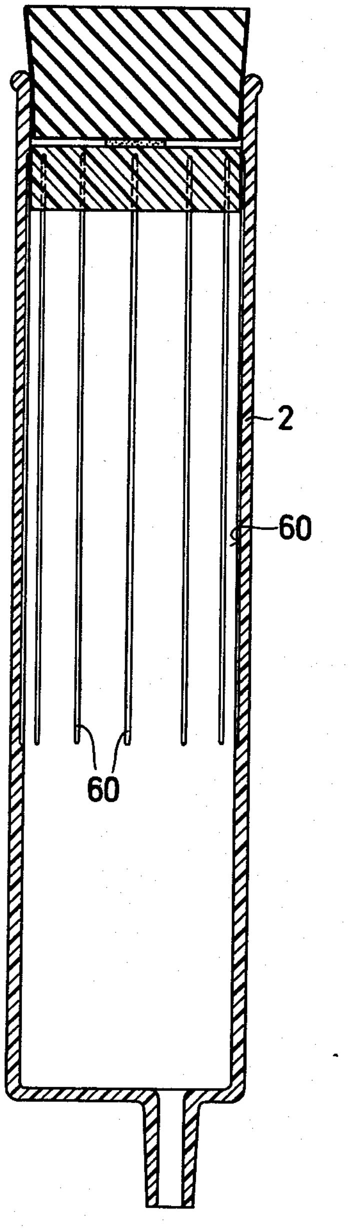
FIG. 11 is a cross-section through a separator tube having internal axial grooves; and, FIG. 12 is a cross-section through a separator tube having internal spiral grooves.

In FIG. 11, axial grooves 60 having a depth of 0.02 to 0.5 mm are formed in the inner face of the tube. These grooves act to prevent a deposit of thrombocytes at the upper edge and on the tapering surface of the separator element when the device is being used to separate components of blood.

Figure 12:
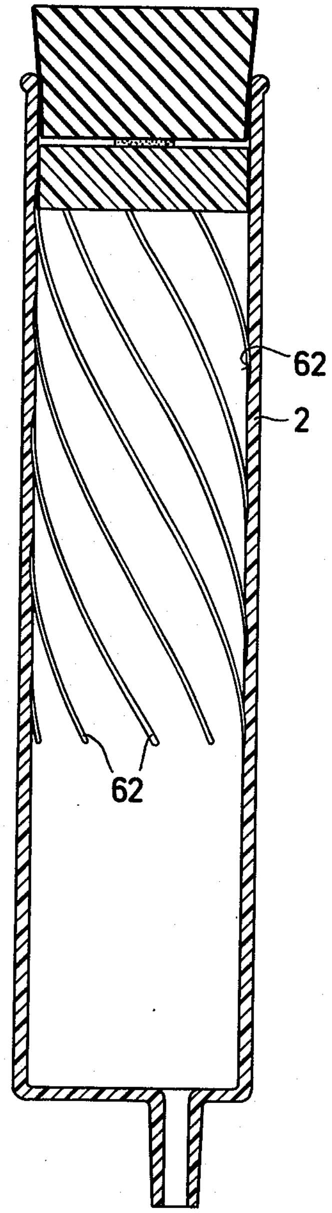

Alternatively, as shown in FIG. 12, internal spiral grooves 62 may be provided for the same purpose.

It is appropriate for these grooves 60 and 62 to be coated with a silicone oil or silicone grease, which initially assures a total seal but then passes downwards under centrifugal force and thus opens the way for the thrombocyte layer.

What I claim is:

1. For use in centrifugal separation of a liquid having at least two components having different specific weights, a device comprising:

wall means of a predetermined thickness of synthetic plastic material defining a separator tube having an inner face of generally round transverse cross-sectional figure;

a generally cylindrical, piston-like, substantially rigid, separator element having a specific weight which lies between the respective specific weights of said two components;

said separator element having an outer peripheral surface with a generally round transverse cross-sectional figure;

said separator element outer peripheral surface having at least an axially intermediate portion thereof which is of substantially the same diameter as said inner face of said separator tube wall means;

said separator element being frictionally, axially slidably received in said separator tube;

said separator element being comparatively rigid relative to said separator tube wall means and said separator tube wall means being sufficiently flexible relative to said separator element, to enable substantially only that portion of said tube wall means conincident to said separator element to flex and thereby increase in diameter sufficient to enable passage of liquid between said that portion and said separator element, in response to centrifugal force.

2. A separator device according to claim 1, in which the separator element is releasably connected to a piston or rod arranged to slide within the tube, and is equipped with a connector for a hypodermic needle.

3. A separator device according to any of claims 1 or 2, in which the connector for the hypodermic needle is releasably arranged on the separator tube.

4. A separator device according to any of claims 1, 2 or 3, in which the separator tube or a space in communication with a connector for a hypodermic needle is connected to a reduced-pressure chamber.

5. A separator device according to claim 1, in which the separator element is connected to a piston rod in the separator tube through a fracture section, and acts as a suction piston.

6. A separator device according to claim 5, in which the separator element is of conical form at the side remote from the hypodermic needle connector, and merges into the piston rod in the area of the apex of the cone.

7. A separator device according to claims 5 or 6, in which the piston rod has lateral guiding fins.

8. A separator device according to claim 1, in which the separator tube is provided with a connector for a hypodermic needle, and a cover for said connector.

9. A separator device according to claim 8, in which the cover is of approximately hemispherical form, and a rim of the hemispherical cover is in snap-in engagement with the lower rim portion of the separator tube.

10. A separator device according to claim 8 or claim 9, in which a sealing cap is provided to close off the connector, the cap being joined through a trunk portion of the hemispherical cover.

11. A separator device according to claim 10, in which the sealing cap for the connector has a sealing finger arranged to extend into the bore of the connector.

12. A separator device according to claim 8, in which the bore of the connector extends through a tubular extension into the interior of the separator tube.

13. A separator device according to claim 12, in which a finger-like projection on the base surface of the separator element is arranged to close the bore of said connector.

14. A separator device according to claim 12 or claim 13, in which the bores of the connector and of the tubular extension are arranged coaxially.

15. The device of claim 1, in which:

said separator element has an axially intermediate region of greatest outer diameter, lead and trailed by respective regions of decreasing diameter.

16. The device of claim 15, wherein:

said respective regions of decreasing diameter are generally conically curved coaxially of said separator element.

17. The device of claim 1, further including:

means defining a plurality of axially extending lateral guiding fins on said separator element.

18. The device of claim 1, wherein:

the wall means of said separator tube is of progressively increasing thickness and thus of decreasing flexibility along the length thereof in the axial direction of movement of the separator element therealong during centrifuging.

19. The device of claim 1, wherein:

the wall means of said separator tube is of progressively decreasing internal diameter along the length thereof in the axial direction of movement of the separator element therealong during centrifuging.

20. The device of claim 1, wherein:

said separator tube wall means inner face is provided with a plurality of axially extending grooves distributed about the circumference thereof at least in the vicinity of said separator element during initiation of centrifuging, for preventing deposition of thrombocytes when the device is being used to separate components of blood.

21. The device of claim 20, wherein:

said grooves proceed spirally of said inner face as they proceed axially thereof.

22. The device of claim 20, wherein:

said grooves are initially coated with a sealant which is subject to flow under centrifugal force during centrifuging in order to pass a thrombocyte layer.

* * * * *